United States Patent
Mukherjee

(10) Patent No.: US 12,204,904 B2
(45) Date of Patent: *Jan. 21, 2025

(54) DYNAMIC DESIGNATION OF INSTRUCTIONS AS SENSITIVE FOR CONSTRAINING INSTRUCTION EXECUTION

(71) Applicant: Marvell Asia Pte, Ltd., Singapore (SG)

(72) Inventor: Shubhendu Sekhar Mukherjee, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 54 days.

This patent is subject to a terminal disclaimer.

(21) Appl. No.: 17/665,991

(22) Filed: Feb. 7, 2022

(65) Prior Publication Data
US 2022/0156076 A1    May 19, 2022

Related U.S. Application Data

(63) Continuation of application No. 17/081,099, filed on Oct. 27, 2020, now Pat. No. 11,307,857.
(Continued)

(51) Int. Cl.
*G06F 9/30* (2018.01)
*G06F 9/38* (2018.01)
(Continued)

(52) U.S. Cl.
CPC ...... *G06F 9/30156* (2013.01); *G06F 9/30036* (2013.01); *G06F 9/30101* (2013.01);
(Continued)

(58) Field of Classification Search
CPC ............ G06F 9/30101; G06F 9/30156; G06F 9/3836; G06F 9/3851; G06F 9/3867
See application file for complete search history.

(56) References Cited

U.S. PATENT DOCUMENTS 9,436,603 B1    9/2016  Pohlack
9,824,225 B1   11/2017  Polansky
(Continued)

FOREIGN PATENT DOCUMENTS

JP    2010108315 A    5/2010
WO    2019180402 A1   9/2019

OTHER PUBLICATIONS

Townley et al., "SMT-COP: Defeating Side-Channel Attacks on Execution Units in SMT Processors," 2019 28th International Conference on Parallel Architectures and Compilation Techniques (PACT), Seattle, WA, USA, 2019, pp. 43-54.
(Continued)

*Primary Examiner* — Jacob Petranek
(74) *Attorney, Agent, or Firm* — Young Basile Hanlon & MacFarlane, P.C.

(57) ABSTRACT

Described herein are systems and methods for dynamic designation of instructions as sensitive. For example, some methods include detecting that a first instruction of a first process has been designated as a sensitive instruction; checking whether a sensitive handling enable indicator in a process state register storing a state of the first process is enabled; responsive to detection of the sensitive instruction and enablement of the sensitive handling enable indicator, invoking a constraint for execution of the first instruction; executing the first instruction subject to the constraint; and executing a second instruction of the first process without the constraint.

29 Claims, 9 Drawing Sheets

Related U.S. Application Data

(60) Provisional application No. 62/944,245, filed on Dec. 5, 2019.

(51) Int. Cl.
  *G06F 9/455* (2018.01)
  *G06F 9/48* (2006.01)

(52) U.S. Cl.
  CPC ........ *G06F 9/30152* (2013.01); *G06F 9/3836* (2013.01); *G06F 9/3851* (2013.01); *G06F 9/3867* (2013.01); *G06F 9/45533* (2013.01); *G06F 9/4881* (2013.01); *G06F 2209/484* (2013.01)

(56) References Cited

U.S. PATENT DOCUMENTS

| | | | |
|---|---|---|---|
| 9,852,070 | B2 | 12/2017 | Seo et al. |
| 9,887,833 | B2 | 2/2018 | Sethumadhavan et al. |
| 10,719,632 | B2 | 7/2020 | Persson et al. |
| 10,740,220 | B2 | 8/2020 | Mola |
| 10,771,236 | B2 | 9/2020 | Courtney |
| 10,846,399 | B2 | 11/2020 | Park et al. |
| 10,860,215 | B2 | 12/2020 | Jagtap et al. |
| 10,891,235 | B2 | 1/2021 | Garcia Guirado |
| 10,929,535 | B2 | 2/2021 | Sukhomlinov et al. |
| 10,936,714 | B1 | 3/2021 | McIntosh |
| 11,144,468 | B2 | 10/2021 | Basak et al. |
| 11,163,857 | B2 | 11/2021 | Moritz et al. |
| 11,372,647 | B2 | 6/2022 | Mukherjee |
| 2006/0288192 | A1 | 12/2006 | Abernathy et al. |
| 2008/0126766 | A1 | 5/2008 | Chheda et al. |
| 2009/0089564 | A1 | 4/2009 | Brickell et al. |
| 2019/0034356 | A1 | 1/2019 | Nunez Mencias et al. |
| 2019/0114422 | A1 | 4/2019 | Johnson et al. |
| 2019/0163512 | A1 | 5/2019 | Hackett |
| 2020/0065112 | A1 | 2/2020 | Gotze |
| 2020/0133679 | A1 | 4/2020 | Brandt et al. |
| 2021/0096872 | A1 | 4/2021 | LeMay |
| 2021/0173657 | A1 | 6/2021 | Mukherjee |
| 2022/0229667 | A1 | 7/2022 | Mukherjee |

OTHER PUBLICATIONS

Aldaya et al., "Port Contention for Fun and Profit", 2019 IEEE Symposium on Security and Privacy, pp. 870-887, Date of Conference: May 19-23, 2019, Date published online for download availability: Sep. 16, 2019.

Suh et al., "Secure Program Execution via Dynamic Information Flow Tracking", MIT Computer Science and Artificial Intelligence Laboratory Technical Report, Jul. 21, 2003.

Yue Zhang, Ziyuan Zhu, Dan Men. "DDM: A Demand-based Dynamic Mitigation for SMT Transient Channels" arXiv:1910.12021 (Year: 2019).

Wu. M. et al., Eliminating Timing Side-Channel Leaks using Program Repair, 2018, ACM, 12 pages. (Year: 2018).

Heo, I., et al., Implementing an Application-Specification Instruction-Set Processor for System-Level Dynamic Program Analysis Engines., 2015, ACM, pp. 53:1-53:32. (Year: 2015).

Ben El Ouahma, Ines et al., Side channel robustness analysis of masked assembly codes using a symbolic approach, Mar. 2019, Springer-Veriag, pp. 9:231-242. (Year: 2019).

Coppens, B., et al., Practical Mitigations for Timing-Based Side-Channel Attacks on Modern x86 Processors, 2009 IEEE pp. 45-60. (Year: 2009).

Siddiqui, A. S. et al., Secure Design Flow of FPGA Based RISC-V Implementation, 2019, IEEE, pp. 37-42., (Year: 2019).

McKeen et al., "Innovative instructions and software model for isolated execution," Intel, pp. 1-8, Jun. 23, 2013, Retrieved from Internet URL: https://www.intel.com/content/dam/develop/external/us/en/documents/hasp-2013-innovative-instructions-and-software-model-for-isolated-execution.pdf.

Office Action issued in corresponding Japanese application No. 2020-195581 dated Jul. 11, 2023.

DYNAMIC DESIGNATION OF INSTRUCTIONS AS SENSITIVE FOR CONSTRAINING INSTRUCTION EXECUTION

CROSS-REFERENCE TO RELATED APPLICATION(S)

This application is a continuation of U.S. application patent Ser. No. 17/081,099, filed Oct. 27, 2020, which claims priority to and the benefit of U.S. Provisional Application Patent Ser. No. 62/944,245, filed Dec. 5, 2019, each of which is incorporated herein by reference.

TECHNICAL FIELD

This disclosure relates to dynamic designation of instructions as sensitive.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

SUMMARY

Disclosed herein are implementations of dynamic designation of instructions as sensitive.

A first aspect of the disclosed implementations is an integrated circuit for executing instructions that includes: a register that includes a sensitive handling enable indicator, and a processor core configured to: detect that a first instruction of a first process has been designated as a sensitive instruction; check whether the sensitive handling enable indicator is enabled; responsive to detection of the sensitive instruction and enablement of the sensitive handling enable indicator, invoke a constraint for execution of the first instruction; execute the first instruction subject to the constraint; and execute a second instruction of the first process without the constraint.

A second aspect of the disclosed implementations is a method that includes detecting that a first instruction of a first process has been designated as a sensitive instruction; checking whether a sensitive handling enable indicator in a process state register storing a state of the first process is enabled; responsive to detection of the sensitive instruction and enablement of the sensitive handling enable indicator, invoking a constraint for execution of the first instruction; executing the first instruction subject to the constraint; and executing a second instruction of the first process without the constraint.

A third aspect of the disclosed implementations an integrated circuit for executing instructions that includes: a register that includes a sensitive handling enable indicator, and a processor core configured to: fetch a first instruction, wherein the instruction includes a sensitive bit that indicates the first instruction is sensitive; based on the sensitive bit and a current value if the sensitive handling enable indicator, invoke a constraint for execution of the first instruction; execute the first instruction subject to the constraint; and execute a second instruction without the constraint.

A fourth aspect of the disclosed implementations an integrated circuit for executing instructions that includes: a processor pipeline configured to execute instructions from two or more threads in parallel using execution units of the processor pipeline; a register that includes a sensitive handling enable indicator; and a thread hazard circuitry configured to detect that an instruction of a first thread has been designated as a sensitive instruction, checking whether the sensitive handling enable indicator is enabled, and, responsive to detection of the sensitive instruction and enablement of the sensitive handling enable indicator, block instructions of threads other than the first thread from being executed using execution units of processor pipeline while the sensitive instruction is being executed by an execution unit of the processor pipeline.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
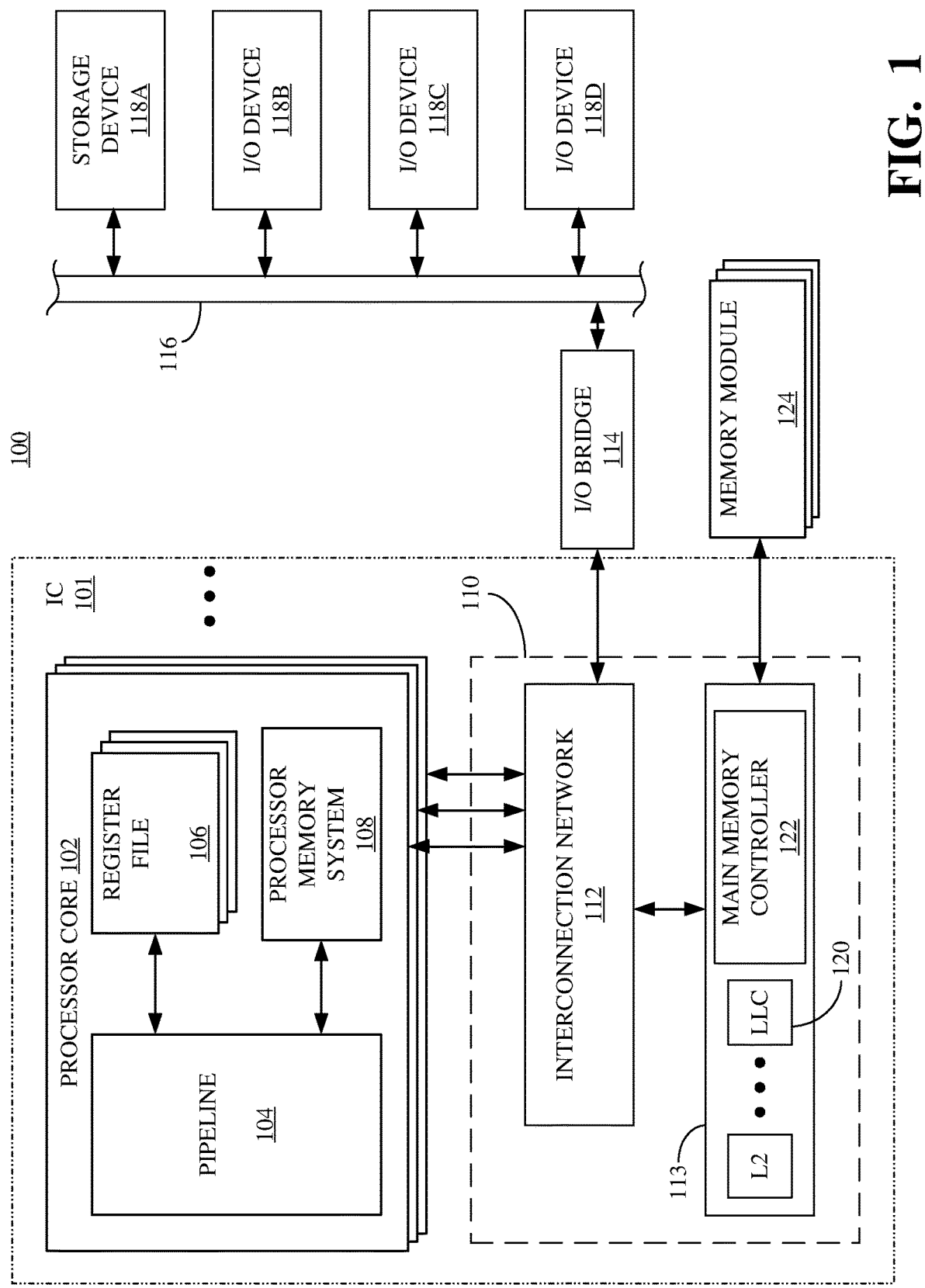
FIG. 1 is a high-level block diagram of an example of a computing system 100.

Described herein are systems and methods for dynamic designation of instructions as sensitive. Side-channel attacks on processors, such as Portsmash, have been discovered recently. A side-channel attack is one in which a spy can discover information about a victim entity using knowledge of the implementation, rather than weakness in an implemented algorithm itself. For example, if a spy can discover what instructions are executing on a victim process in a computer system by measuring timing information about the spy itself, then it would be considered a side-channel attack.

In some instances, the victim may feasibly designate which instructions or which section of code could be vulnerable to side-channel attacks. Or rather which instructions or code, if attacked, would cause serious harm. AES encryption instructions are examples of such a class of instructions.

Typically, the operating system or hypervisor handles resource allocation and makes policy decision in a processor, whereas the hardware may be providing primitives. For example, the operating system decides how to allocate memory pages, whereas the hardware provides the primitives for virtual memory. Similarly, security can be viewed as a similar problem where the OS/hypervisor decides how to protect "sensitive" instructions and code. The hardware may provide primitives to support that.

This disclosure describes how software can designate certain instructions as sensitive or not. Whether an instruction is sensitive or not may be blessed by a higher privilege level process after a request has been made by a lower privilege level process. For example, in ARM, an EL0 user process can request to mark an instruction as sensitive. However, if the hardware allows the instruction to be marked as sensitive, then this could be used for malicious purposes (e.g., to slow down the computing system). To address this issue, whether an instruction can be marked as sensitive may be controlled by a higher privilege level software process (e.g., a hypervisor process).

Different ways of marking instructions as sensitive instructions may be employed, which can be blessed by higher level software. A first mechanism uses an additional bit in every instruction. Thus, every instruction can be independently designated as sensitive or non-sensitive. Software can issue either version of the instruction. There may be a separate system control register in which higher level software would designate if a lower privilege execution process' sensitive instruction would be recognized as such. For example, if the system control register bit is not set, then hardware may not recognize the instruction as sensitive and would not invoke a constraint on execution to protect the execution of the instruction. For example, if the system control register bit is set, then hardware may execute the instruction as a sensitive instruction, subject to a constraint that serves to enhance security of the process that includes the sensitive instruction.

A second mechanism may designate a subsequence of instructions (e.g., a region of instructions) as sensitive. Lower level software may make an upcall to set a system control bit, which would now indicate that all subsequent instructions are sensitive. If higher level software allows the bit to be set, then hardware will take appropriate actions. Subsequently, lower level software may make another upcall to unset the bit.

The systems and techniques described herein may provide advantages over conventional systems and techniques, such as, for example, providing a clean separation between policies (implemented by software) and primitives (implemented by hardware), allowing hardware to provide appropriate protection based on software designation for sensitive instructions, and/or allowing software to provide feedback to hardware to do the appropriate protection mechanism (e.g., invoking a constraint on execution).

Described herein are systems and methods for secure multithread execution. Side-channel attacks on Simultaneous Multithreading (SMT) processors have been discovered recently. A side-channel attack is one in which a spy can discover information about a victim entity using knowledge of the implementation, rather than weakness in implemented algorithm itself. For example, if a spy can discover what instructions are executing on a victim process in a computer system by measuring timing information about the spy itself, then it would be considered a side-channel attack.

SMT processors are a class of multithreaded processors in which multiple hardware threads can execute within the same physical processor core. For example, Intel Xeon supports Hyperthreading, which is a form of SMT processing. Simultaneous execution of SMT threads imply that instructions from multiple threads can populate the pipeline and execute simultaneously in the execution units. The advantage of SMT processing is that idle slots not used by one thread can be filled and used by other threads, thereby boosting performance.

However, a new class of side-channel attacks, called Portsmash, have been disclosed in SMT processors. In such attacks, the spy process discovers information about the victim by timing its own execution. For example, consider a victim process only executing one of two instructions in a loop: VICTIM0 and VICTIM1. Also, assume that VICTIM0 can only execute in in execution unit 0 (called port0) and VICTIM1 can execute only in execution unit 1 (called port1). Similarly, assume that the spy can execute the instructions SPY0 and SPY1. Similarly, SPY0 executes in port0 and SPY1 executes in port1. For simplicity, assume in this example, that the victim only executes VICTIM0 continuously or VICTIM1 continuously.

The question is can the spy figure out which of the two instructions the victim process is executing? The answer is yes. This is how. Let us say the victim is executing continuously either VICTIM0 or VICTIM1. The spy first executes SPY0 continuously and measures time t0 to execute these instructions. Then spy executes same number of SPY1 continuously and measures time t1 to execute these instructions. If t0>t1, then that means the victim was executing VICTIM0 instructions. If t0<t1, then the victim was executing VICTIM1 instructions. This is because both SPY0 and VICTIM0 execute in port0. Thus, if VICTIM0 was executing, it will take SPY0 longer to execute than SPY1, which goes to port1.

The above is simpler version of the more complicated technique described in Aldaya, A. C., Brumley, B. B., ul Hassan, S., García, C. P., & Tuveri, N. (2018) *Port Contention for Fun and Profit*, IACR Cryptology ePrint Archive, 2018, 1060, but the basics are the same. A spy process measures how long it takes to executes its instructions that may compete for the same port as the victim and discover what algorithm the victim may be running. Brumley et al. shows how to break P-384 elliptical curve cryptography using such a mechanism.

One approach to preventing a Portsmash attack is to completely disable SMT processing. That is, you only allow one thread to execute at a time in a physical core. This approach does not achieve high performance because it does not use the full capabilities of a processor.

Another approach to preventing a Portsmash attack is to employ temporal or spatial partitioning of pipeline resources. In temporal partitioning, a processor pipeline can be used only by one thread at a time. Thus, a spy process cannot use port contention to measure how much delayed it might get because of port contention with the victim process. In spatial partitioning, an execution unit and possibly other resources in a processor pipeline are hard-partitioned among threads, such that instructions from two threads do not execute on the same port. Temporal partitioning is sub-optimal in performance because it disallows instructions from a second thread to enter the pipeline when the first thread executes. Spatial partitioning may be difficult to design because in many instances only one port may support a particular kind of execution resource. Spatial partitioning requires as many ports as there are threads for the same execution resource.

This disclosure discusses techniques for preventing these side-channel attacks on multithread processors (e.g., SMT processors).

Instead of using thread-level granularity to partition resources, this disclosure uses instruction-level granularity to partition resources in a multithread pipeline (e.g., an SMT pipeline). At a high-level, these techniques may include: 1.) recognizing that an instruction (potentially in a victim process) is "sensitive." A sensitive instruction may be one that could expose secrets. Examples of sensitive instructions may include Advanced Encryption standard (AES) single round decryption or AES single round encryption, etc.

2.) If a sensitive instruction executes in a cycle, then only allow instructions from the same thread executing the sensitive instruction to execute in the execution units. Thus, in the above example, SPY0 or SPY1 will take equally long to execute (t0~=t1) when VICTIM0 or VICTIM1 executes.

Normally, the issue and dispatch logic of a processor pipeline will decide if an instruction can be issued to a port in the execution unit. This decision may include resolving structural hazards, constraints, and RAW (read-after-write) dependences. In some implementations, the issue logic will additionally now resolve a new "thread hazard." This is a new rule that states if a sensitive instruction has been chosen to execute from one thread, then instructions from no other thread can execute simultaneously for the one or more cycles during which the sensitive instruction is executing.

Some implementations may provide advantages over earlier systems, such as; preventing side channel attacks (e.g., Portsmash attacks) while maintaining high performance in terms of average instruction throughput.

Figure 2A:
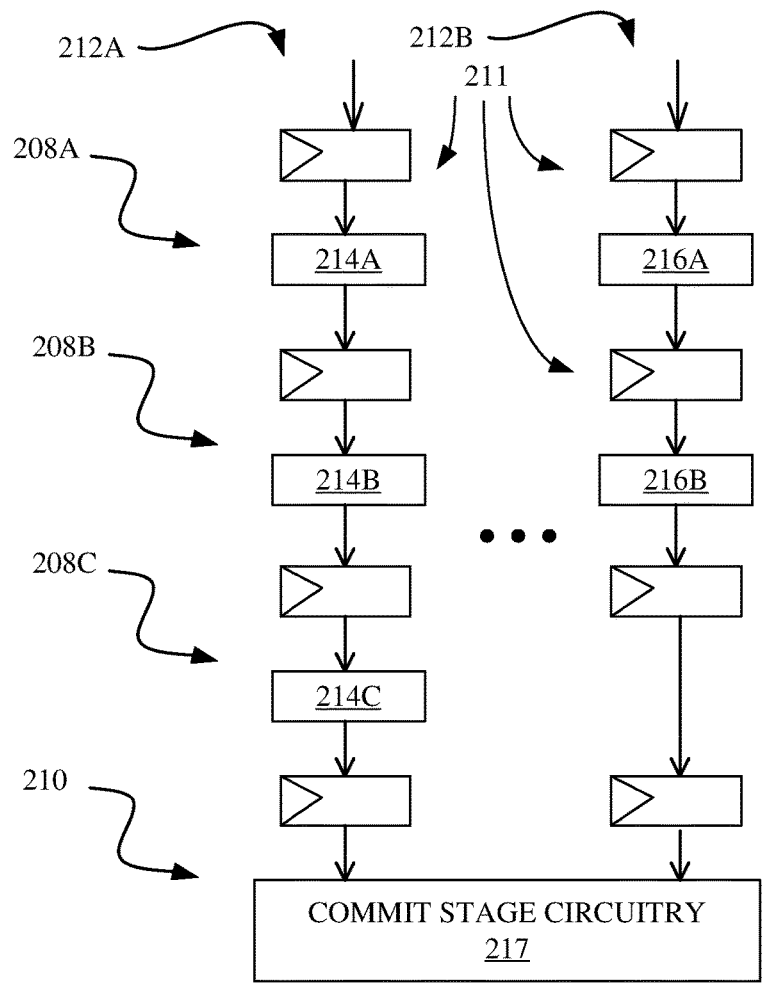
FIG. 2A is an example of a configuration of the pipeline of FIG. 1.
Figure 2A:
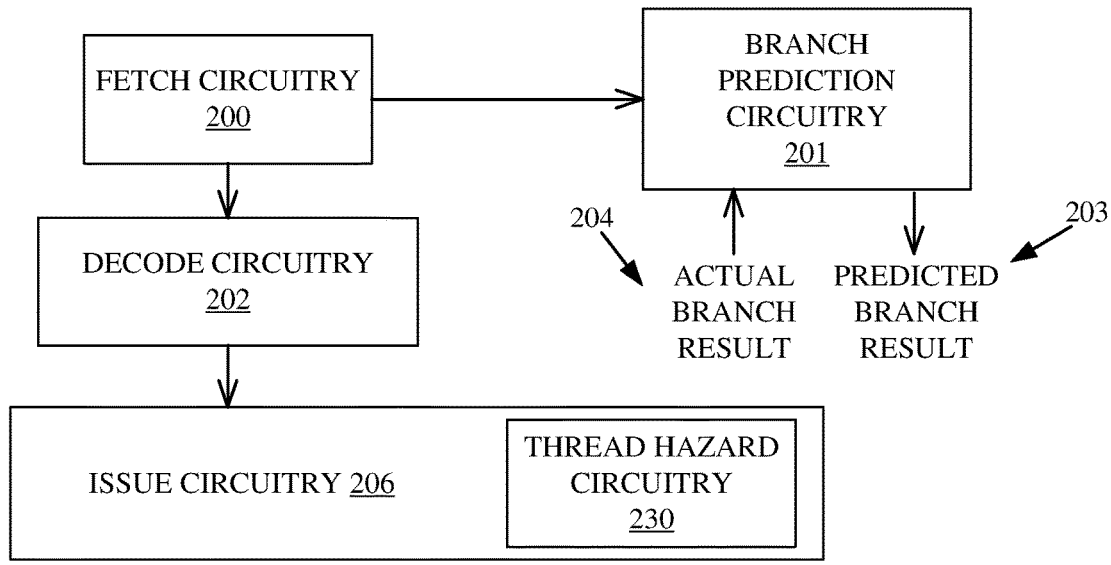
Figure 2B:
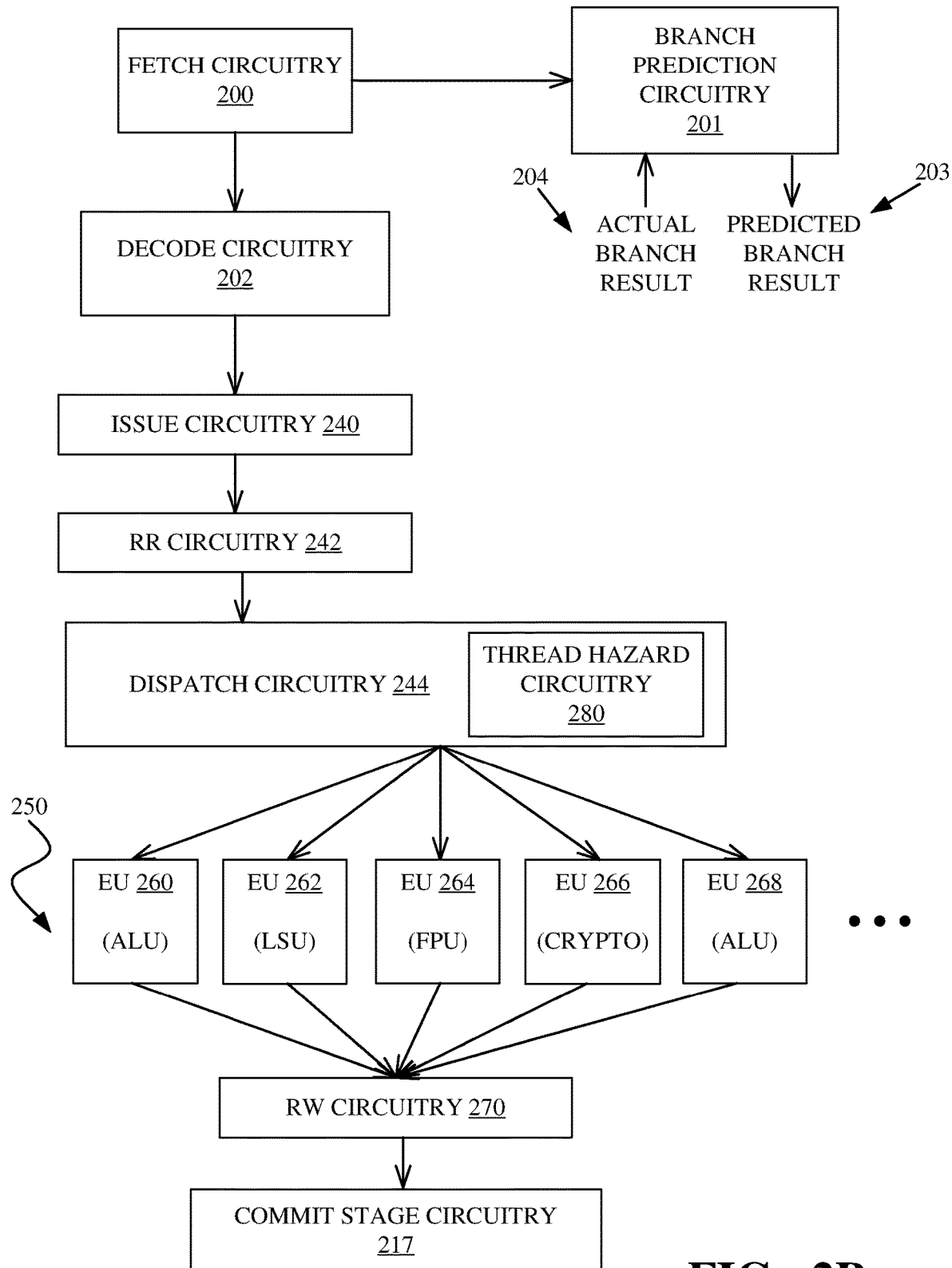
FIG. 2B is an example of a configuration of the pipeline of FIG. 1.
Figure 3:
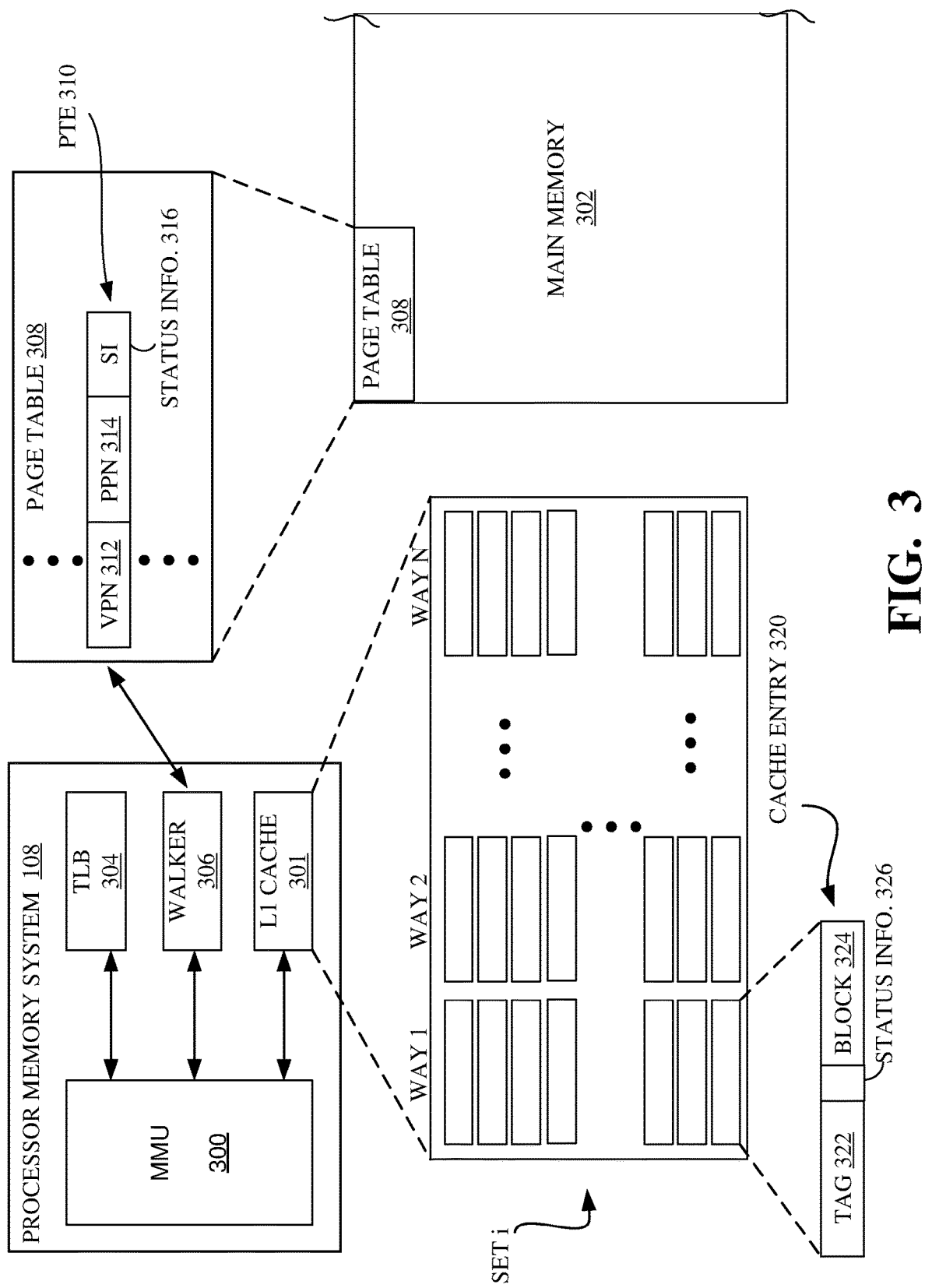
FIG. 3 is an example of a configuration of the processor memory system of FIG. 1.

Further details of techniques for secure multithread execution are described herein with initial reference to a system in which they can be implemented, as shown in FIGS. 1 through 3.

FIG. 1 is a high-level block diagram of an example of a computing system 100. The computing system 100 includes an integrated circuit 101 with at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a processor pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L3 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the processor pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The processor pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2A and FIG. 2B. The processor pipeline 104 may be configured to execute instructions from two or more threads in parallel using execution units of the processor pipeline. For example, the core 102 may be a simultaneous multithreading (SMT) processor. The core 102 may include a Some stages occur in a front-end portion of the pipeline. Some other stages occur in a back-end portion of the pipeline. The front-end portion can include pre-execution stages. The back-end portion of the pipeline can include execution and post-execution stages. For example, the processor pipeline 104 may be the processor pipeline 220 of FIG. 2A. For example, the processor pipeline 104 may be the processor pipeline 222 of FIG. 2B.

The integrated circuit 101 may include a thread hazard circuitry configured to detect that an instruction of a first thread has been designated as a sensitive instruction, and, responsive to detection of the sensitive instruction, block instructions of threads other than the first thread from being executed using execution units of processor pipeline while the sensitive instruction is being executed by an execution unit of the processor pipeline. For example, a thread hazard circuitry may be part of or interface with the processor pipeline 104. In some implementations, the thread hazard circuitry may serve to prevent certain side channel attacks (e.g., a Portsmash attack), while maintaining the performance advantages of an SMT processor during executions of many or most instructions.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed (i.e., retired) so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2A is an example of a configuration of a processor pipeline 220. The processor pipeline 220 may be configured to execute instructions from two or more threads in parallel using execution units of the processor pipeline.

The processor pipeline 220 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the processor pipeline 220. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the processor pipeline 220 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the processor pipeline 220. For simplicity of explanation, only three execution stages are illustrated in FIG. 2A. However, the disclosure herein is not so limited: more or fewer execution stages are possible.

The integrated circuit 101 includes a thread hazard circuitry 230. In this example, the thread hazard circuitry 230 is part of an issue circuitry 206 of the processor pipeline 220. The thread hazard circuitry 230 may be configured to detect that an instruction of a first thread has been designated as a sensitive instruction, and, responsive to detection of the sensitive instruction, block instructions of threads other than the first thread from being executed using execution units of processor pipeline 220 while the sensitive instruction is being executed by an execution unit of the processor pipeline 220.

In some implementations, sensitive instructions may be statically designated (e.g., a certain type of instruction is always considered sensitive). For example, the thread hazard circuitry 230 may be configured to detect a sensitive instruction based on an opcode of the instruction. In some implementations, sensitive instructions may be dynamically designated (e.g., an instruction may be marked as sensitive by software using a flag). For example, the thread hazard circuitry 230 may be configured to detect a sensitive instruction based on a flag included in the instruction (e.g., a sensitive bit). For example, the thread hazard circuitry 230 may be to detect a sensitive instruction based on a flag in an architectural register.

A variety of different instructions may be considered as sensitive, depending on the applications being executed. For example, the sensitive instruction may be a cryptographic instruction. For example, the sensitive instruction may be an AES single round decryption instruction. For example, the sensitive instruction may be an AES single round encryption instruction.

The processor pipeline 220 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217. Instead, the results of the instructions may be committed by other circuitry, such as circuitry in another stage of the back-end or a stage of the front-end, possibly based on information from the commit stage.

Between adjacent stages of the processor pipeline 220, the various paths through the pipeline circuitry include pipeline registers. For example, shown in FIG. 2A are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 212A and 212B are shown in FIG. 2A. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2A, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the processor pipeline 220 can be configured to perform other types of speculative execution. In an example of another type of speculative execution, the processor pipeline 220 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the processor pipeline 220 includes a particular address to be prefetched. A prefetch request can be or can include a hardware prefetch that is performed by hardware within the processor (e.g., the processor core 102) without an explicit prefetch instruction being inserted into its pipeline (e.g., the processor pipeline 220).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the processor pipeline 220 by the issue circuitry 206 to be handled at the appropriate stage. An example of such an externally received instruction is a TLB invalidation (TLBI) instruction for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution. In some cases, an external instruction may cause an interrupt in a program that is being executed.

FIG. 2B is an example of a configuration of a processor pipeline 222. The processor pipeline 222 may be configured to execute instructions from two or more threads in parallel using execution units of the processor pipeline.

The processor pipeline 222 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the processor pipeline 222. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the processor pipeline 222 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an example of the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 240 can determine a respective cycle in which each of the instructions in the issue queue are to be issued. Issuing an instruction makes the instruction available to progress through circuitry of an instruction execution (IE) stage, such as an execution stage 250, of the processor pipeline 222. For simplicity of explanation, only one execution stage is illustrated in FIG. 2B. However, the disclosure herein is not so limited: more or fewer execution stages are possible.

A register read circuitry 242 may be configured to read register values (e.g., from the one or more register files 106) when they become available for use as input arguments for executing an instruction in the execution stage 250.

A dispatch circuitry 244 may be configured to assign an instruction to one of the execution units (e.g., 260, 262, 264, 266, or 268) of the execution stage 250 for execution. For example, the dispatch circuitry 244 may select an execution unit based on availability of the execution unit and a match between the instruction type and the type of the execution unit.

The execution stage 250 includes multiple execution units (e.g., 260, 262, 264, 266, and 268) that may be used in parallel. Depending on the instruction type, an instruction may take one or more clock cycles to execute in one of the execution units (e.g., 260, 262, 264, 266, and 268). In this example, the execution unit 260 is an arithmetic logic unit (ALU), the execution unit 262 is a load-store unit (LSU), the execution unit 264 is a floating-point unit (FPU), the execution unit 266 is a cryptographic execution unit, the execution unit 268 is another arithmetic logic unit (ALU). For example, by executing two instructions in different execution units of the execution stage 250 in a given clock cycle, the processor pipeline 222 may execute the two instructions in parallel.

A register write circuitry 270 may be configured to write values to destination registers (e.g., from the one or more register files 106) when the values become available as an output of an execution unit (e.g., 260, 262, 264, 266, or 268) in the execution stage 250.

The integrated circuit 101 includes a thread hazard circuitry 280. In this example, the thread hazard circuitry 280 is part of the dispatch circuitry 244 of the processor pipeline 222. The thread hazard circuitry 280 may be configured to detect that an instruction of a first thread has been designated as a sensitive instruction, and, responsive to detection of the sensitive instruction, block instructions of threads other than the first thread from being executed using execution units of processor pipeline 220 while the sensitive instruction is being executed by an execution unit of the processor pipeline 220.

In some implementations, sensitive instructions may be statically designated (e.g., a certain type of instruction is always considered sensitive). For example, the thread hazard circuitry 280 may be configured to detect a sensitive instruction based on an opcode of the instruction. In some implementations, sensitive instructions may be dynamically designated (e.g., an instruction may be marked as sensitive by software using a flag). For example, the thread hazard circuitry 280 may be configured to detect a sensitive instruction based on a flag included in the instruction (e.g., a sensitive bit). For example, the thread hazard circuitry 280 may be to detect a sensitive instruction based on a flag in an architectural register.

A variety of different instructions may be considered as sensitive, depending on the applications being executed. For example, the sensitive instruction may be a cryptographic instruction. For example, the sensitive instruction may be an AES single round decryption instruction. For example, the sensitive instruction may be an AES single round encryption instruction.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1). Such a miss in a page table that causes a page fault is another example of an interrupt that may be caused during program execution.

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
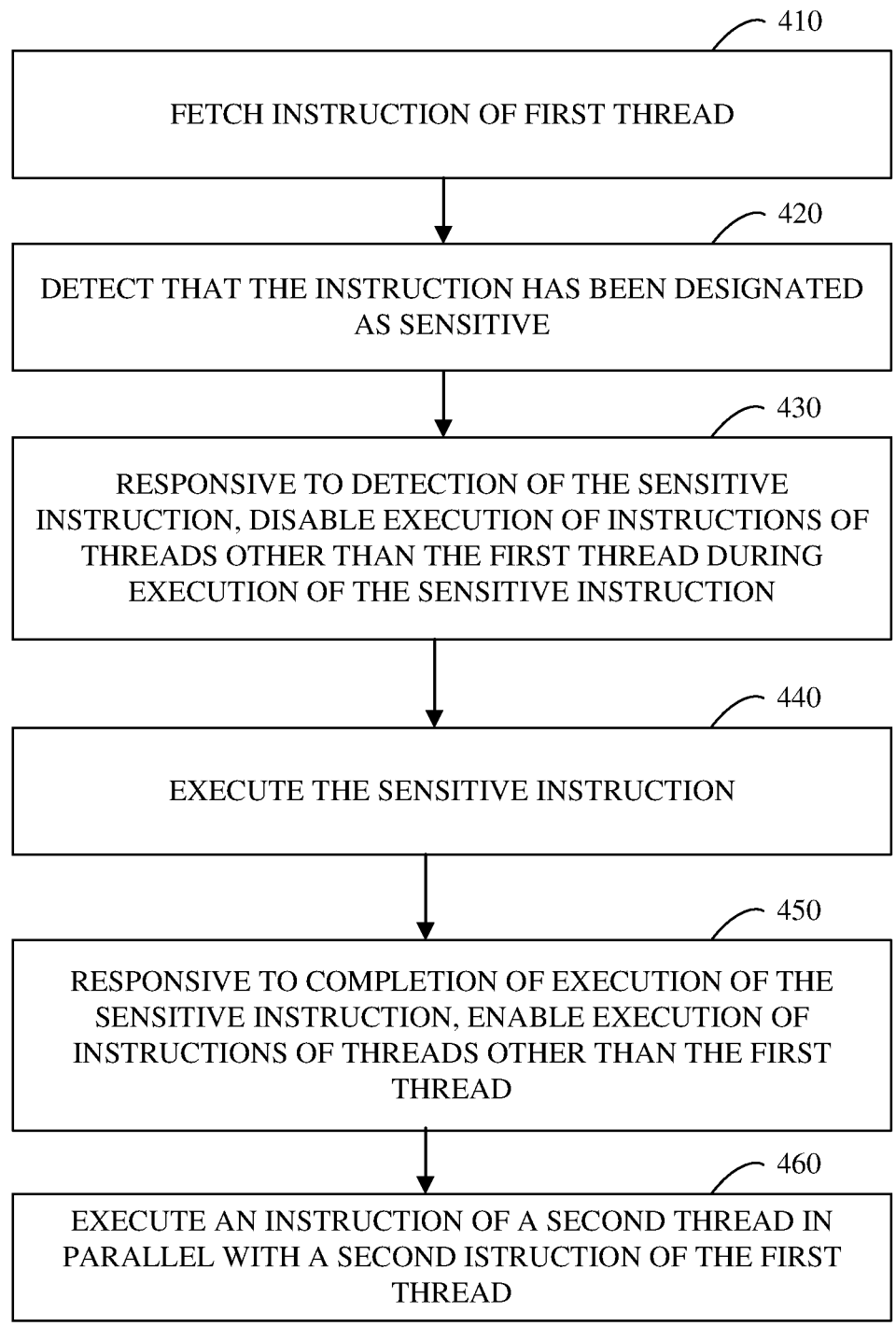
FIG. 4 is a flow chart of an example of a technique for secure multithread execution.

FIG. 4 is a flow chart of an example of a technique 400 for secure multithread execution. The technique includes fetching 410 an instruction of a first thread from a memory into a processor pipeline; detecting 420 that the instruction has been designated as a sensitive instruction; responsive to detection of the sensitive instruction, disabling 430 execution of instructions of threads other than the first thread in the processor pipeline during execution of the sensitive instruction by an execution unit of the processor pipeline; executing 440 the sensitive instruction using an execution unit of the processor pipeline; responsive to completion of execution of the sensitive instruction, enabling 450 execution of instructions of threads other than the first thread in the processor pipeline; and executing 460, using execution units of the processing pipeline, an instruction of a second thread in parallel with a second instruction of the first thread. For example, the technique 400 may be implemented using the integrated circuit 101 of FIG. 1. For example, the technique 400 may be implemented using the processor pipeline 220 of FIG. 2A. For example, the technique 400 may be implemented using the processor pipeline 222 of FIG. 2B.

The technique 400 includes fetching 410 an instruction of a first thread from a memory (e.g., via the processor memory system 108) into a processor pipeline (e.g., the processor pipeline 104) that is configured to execute instructions from two or more threads in parallel using execution units of the processor pipeline. For example, the processor pipeline may be included in a simultaneous multithreading processor.

The technique 400 includes detecting 420 that the instruction has been designated as a sensitive instruction. In some implementations, sensitive instructions may be statically designated (e.g., a certain type of instruction is always considered sensitive). For example, the sensitive instruction may be detected 420 based on an opcode of the instruction. In some implementations, sensitive instructions may be dynamically designated (e.g., an instruction may be marked as sensitive by software using a flag). For example, the sensitive instruction may be detected 420 based on a flag included in the instruction (e.g., a sensitive bit). For example, the sensitive instruction may be detected 420 based on a flag in an architectural register. For example, the technique 600 of FIG. 6 may be implemented to detect 420 that the instruction has been designated as a sensitive instruction.

A variety of different instructions may be considered as sensitive, depending on the applications being executed. For example, the sensitive instruction may be a cryptographic instruction. For example, the sensitive instruction may be an AES single round decryption instruction. For example, the sensitive instruction may be an AES single round encryption instruction.

The technique 400 includes, responsive to detection of the sensitive instruction, disabling 430 execution of instructions of threads other than the first thread in the processor pipeline during execution of the sensitive instruction by an execution unit of the processor pipeline. In some implementations, disabling 430 execution of instructions of threads other than the first thread in the processor pipeline includes blocking issue of instructions of threads other than the first thread. In some implementations, disabling 430 execution of instructions of threads other than the first thread in the processor pipeline includes blocking dispatch of instructions of threads other than the first thread. For example, disabling 430 execution of instructions of threads other than the first thread may cause a uniform delay across all ports (i.e., execution units of the processor pipeline), rather than only increasing delays for the port used by the sensitive instruction. Thus, disabling 430 execution of instructions of threads other than the first thread may prevent parallel execution of instructions from multiple threads while a sensitive instruction is being executed, which may prevent certain side channel attacks on the first thread (e.g., a Portsmash attack).

The technique 400 includes executing 440 the sensitive instruction using an execution unit of the processor pipeline. Executing 440 the sensitive instruction using an execution unit (e.g., the execution unit 260, the execution unit 262, the execution unit 264, the execution unit 266, or the execution unit 268) may take one or more clock cycles. For example, some instructions (e.g., a square root instruction or certain cryptographic instructions) may take multiple clock cycles to complete execution.

The technique 400 includes, responsive to completion of execution of the sensitive instruction, enabling 450 execution of instructions of threads other than the first thread in the processor pipeline. Enabling 450 execution of instructions of threads other than the first thread after completion of the sensitive instruction may limit the amount of time that issue/dispatch logic in the processor pipeline is constrained.

The technique 400 includes executing 460, using execution units of the processing pipeline, an instruction of a second thread in parallel with a second instruction of the first thread. Better performance in terms of instruction throughput may be achieved allowing instructions from different threads to execute in parallel when no sensitive instruction is being executed, since it may increase the utilization of the execution units of the processor pipeline. These performance gains may be achieved without substantially compromising security where it is known that no sensitive instruction is currently being executed while different threads share the execution stage (e.g., the execution stage 250) of the pipeline.

For simplicity of explanation, the technique 400 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 5:
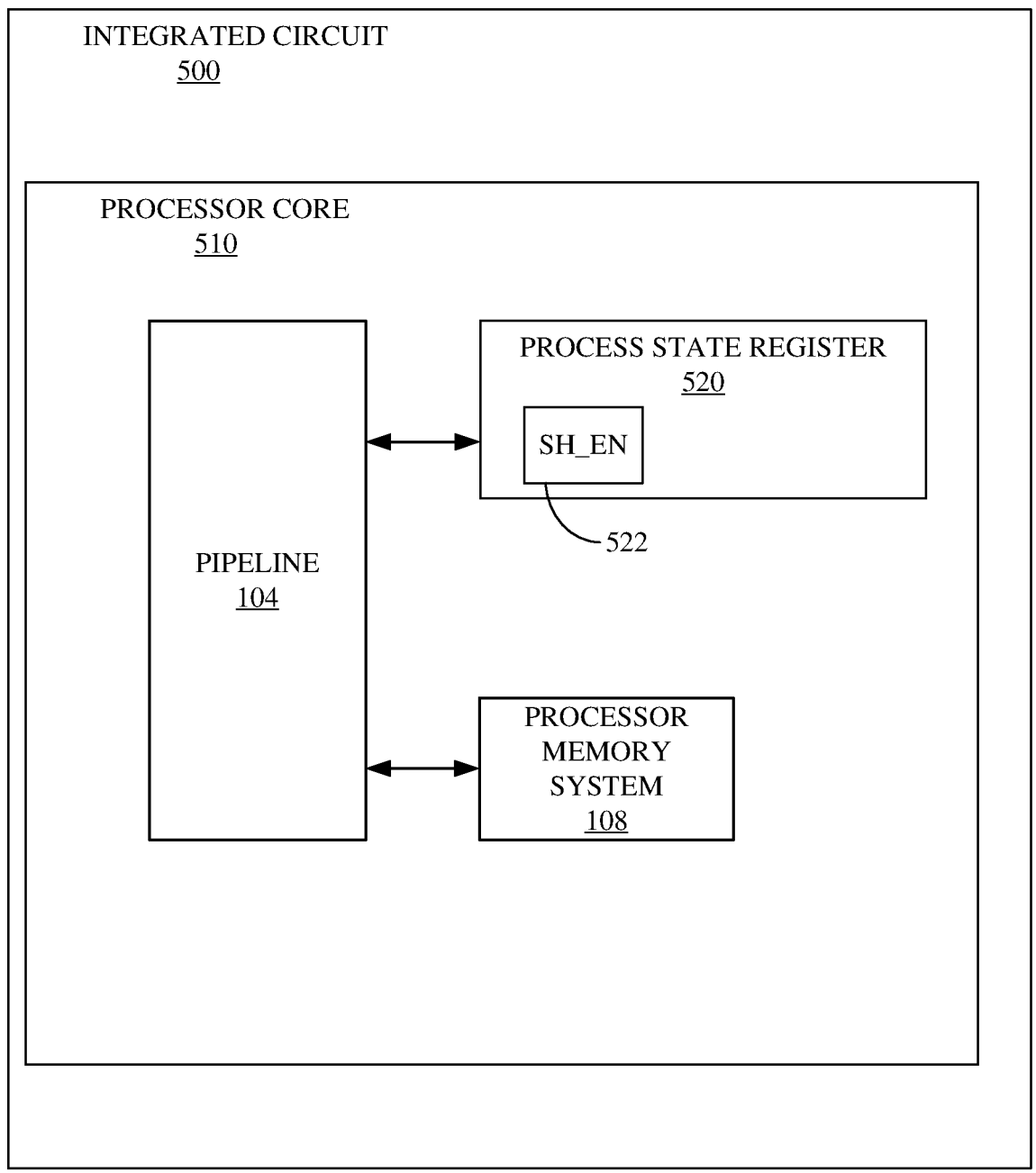
FIG. 5 is a block diagram of an example of an integrated circuit for executing instructions with special handling for dynamically designated sensitive instructions.

FIG. 5 is a block diagram of an example of an integrated circuit 500 for executing instructions with special handling for dynamically designated sensitive instructions. For example, a sensitive handling enable indicator can be used, which in this example is represented as a single bit, but in other examples the sensitive handling enable indicator can use any number of bits, or other representations of information. The integrated circuit 500 includes a processor core 510, which includes the processor pipeline 104, processor memory system 108, and a process status register 520 including a sensitive handling enable bit 522. The sensitive handling enable bit 522 may indicate whether an associated process is authorized to utilize special execution subject to a constraint for certain instructions that the process designates as sensitive (e.g., a cryptographic instruction). The constraint may reduce performance of the processor core 510 in exchange for enhanced security (e.g., protection from side channel attacks) the process invoking the constraint. To reduced performance impairment and prevent attacks exploiting the constraint, the value of the sensitive handling enable bit 522 may be controlled by a high priority process (e.g., a hypervisor process) running on the integrated circuit 500. For example, the integrated circuit 500 may be used to implement the technique 600 of FIG. 6.

The integrated circuit 500 includes the processor pipeline 104, which may be configured to execute instructions from two or more threads in parallel using execution units of the processor pipeline 104. For example, the processor pipeline 104 may be included in a simultaneous multithreading processor. In some implementations, the constraint prevents parallel execution of instructions from other threads while a sensitive instruction is being executed by an execution unit of the processor pipeline 104. For example, the processor pipeline 104 may be the processor pipeline 220 of FIG. 2A. For example, the processor pipeline 104 may be the processor pipeline 222 of FIG. 2B.

The integrated circuit 500 includes a register 520 that includes a sensitive handling enable bit 522. In this example, the register 520 is a process state register storing a state of the first process. A value of the sensitive handling enable bit 522 may either correspond to an enabled state (i.e., the associated process is authorized for execution subject to the constraint) or correspond to a disabled state (i.e., the associated process is not authorized for execution subject to the constraint). The sensitive handling enable bit 522 may be interpreted as active low or active high in different implementations. For example, write access to the sensitive handling enable bit 522 may be restricted to a high priority process (e.g., a hypervisor process or an operating system process).

The integrated circuit 500 includes a processor core 510 with access to the register 520. In this example, the register is part of the processor core 510. The processor core may be configured to limit access to special execution subject to a constraint based on the sensitive handling enable bit 522. The processor core 510 may be configured to allow dynamic designation of individual instructions or sequences of instructions as sensitive instructions. For example, the processor core 510 may be configured to detect that a first instruction of a first process has been designated as a sensitive instruction; check whether the sensitive handling enable bit is enabled; responsive to detection of the sensitive instruction and enablement of the sensitive handling enable bit, invoke a constraint for execution of the first instruction; execute the first instruction subject to the constraint; and execute a second instruction (e.g., which has not been designated as sensitive) of the first process without the constraint. Thus, an authorized process may be enabled to judiciously apply special handling for sensitive instructions to enhance security while limiting any negative impact on performance of the processor core 510.

In some implementations, the first instruction includes a sensitive bit, and the processor core 510 is configured to detect that the first instruction has been designated as a sensitive instruction by evaluating the sensitive bit of the first instruction. For example, an instruction set supported by the processor core 510 may include a sensitive bit in some or all instructions of the instruction set, and software using the instruction set may dynamically set the sensitive bit for a particular instruction based on the needs of an application. For example, the processor core 510 may be configured to fetch a first instruction, wherein the instruction includes a sensitive bit that indicates the first instruction is sensitive; based on the sensitive bit and a current value if the sensitive handling enable bit, invoke a constraint for execution of the first instruction; execute the first instruction subject to the constraint; and execute a second instruction (e.g., which has not been designated as sensitive) without the constraint.

In some implementations, the first instruction is preceded by a sensitive-start instruction and followed by a sensitive-stop instruction in a sequence of instructions of the first process, and the processor core 510 is configured to detect that the first instruction has been designated as a sensitive instruction based on detection of the sensitive-start instruction. For example, the first instruction may be a member of a subsequence of instructions that is immediately preceded by the sensitive-start instruction and immediately followed by the sensitive-stop instruction in the sequence of instructions of the first process, and the processor core 510 may be configured to execute all members of the subsequence of instructions subject to the constraint. For example, the technique 700 of FIG. 7 may be implemented to detect subsequences of one or more sensitive instructions that are designated by software using a sensitive-start instruction and sensitive-stop instruction.

The processor core 510 may be configured to update a value of the sensitive handling enable bit 522 based on an instruction of a second process that has a higher priority than the first process. For example, the second process may be a hypervisor process. For example, the second process may be an operating system process.

The processor core 510 may prevent use of execution subject to the constraint for processes that lack authorization as indicated by an associated sensitive handling enable bit 522. For example, when the register 520 is loaded with state information for a third process that lacks authorization, the third process may be prevented from executing an instruction the third process has designated as sensitive using the constraint. For example, the processor core 510 may be configured to detect that a third instruction of a third process has been designated as a sensitive instruction; check whether the sensitive handling enable bit 522 is enabled; and, responsive to disablement of the sensitive handling enable bit 522, execute the third instruction of the third process without the constraint.

Figure 6:
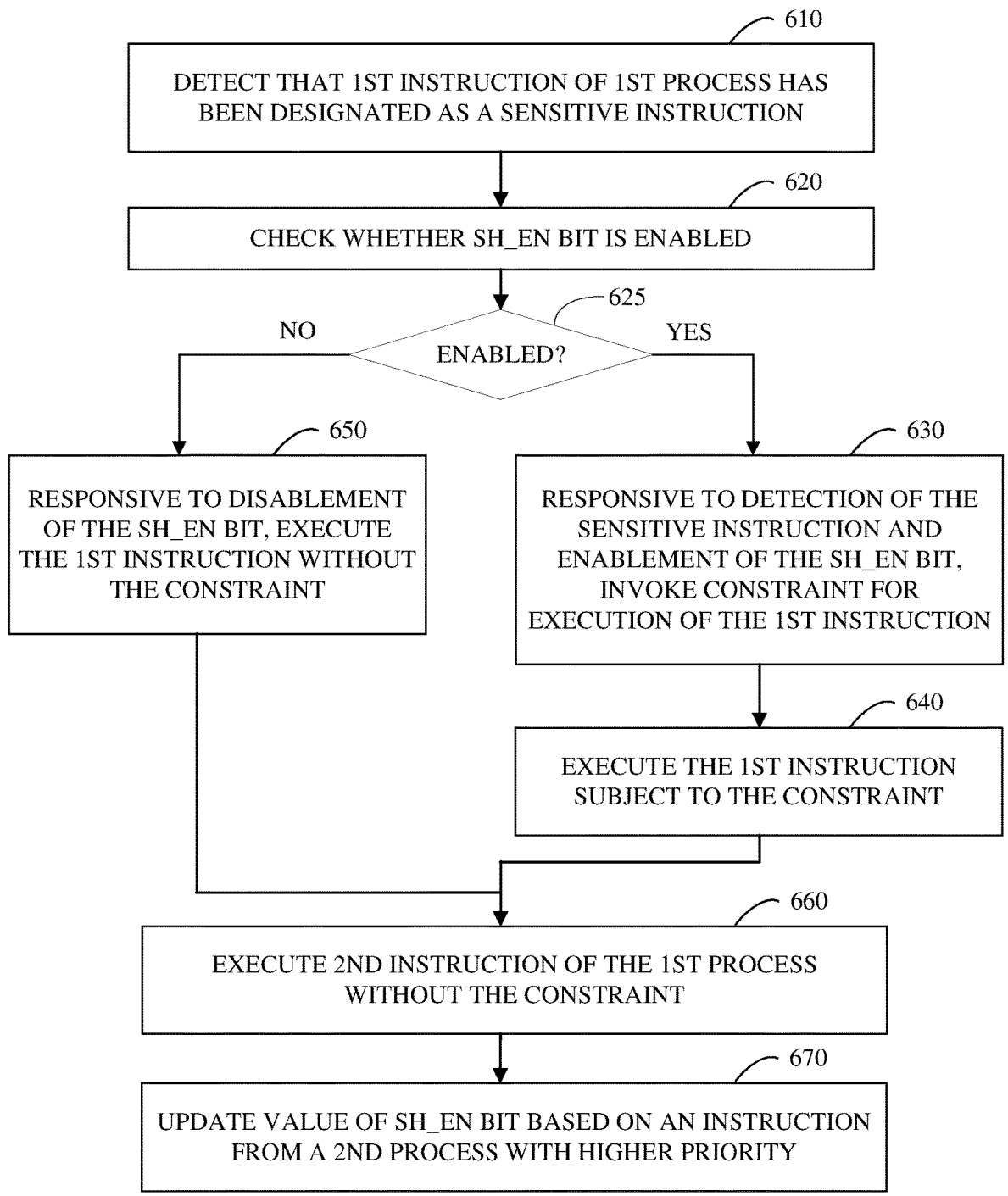
FIG. 6 is a flow chart of an example of a technique for executing instructions with special handling for dynamically designated sensitive instructions.

FIG. 6 is a flow chart of an example of a technique 600 for executing instructions with special handling for dynamically designated sensitive instructions. The technique 600 includes detecting 610 that a first instruction of a first process has been designated as a sensitive instruction; checking 620 whether a sensitive handling enable bit is enabled; if (at step 625) the sensitive handling enable bit is enabled, then, responsive to detection of the sensitive instruction and enablement of the sensitive handling enable bit, invoking 630 a constraint for execution of the first instruction; executing 640 the first instruction subject to the constraint; and executing 660 a second instruction of the first process without the constraint. For example, the technique 600 may be implemented using the integrated circuit 101 of FIG. 1. For example, the technique 600 may be implemented using the integrated circuit 500 of FIG. 5.

The technique 600 includes detecting 610 that a first instruction of a first process has been designated as a sensitive instruction. For example, the first instruction may be a cryptographic instruction (e.g., an AES single round encryption instruction or an AES single round decryption instruction). In some implementations, software may dynamically designate an instruction as sensitive by setting or clearing a sensitive bit of the instruction. For example, detecting 610 that the first instruction has been designated as a sensitive instruction may include evaluating a sensitive bit included in the first instruction. In some implementations, software may dynamically designate a subsequence of instructions as sensitive using specialized instructions (e.g., a sensitive-start instruction and a sensitive-stop instruction) in a sequence of instructions to indicate the start and stop of sensitive handling that executes instructions subject to the constraint. For example, the first instruction may be preceded by a sensitive-start instruction and followed by a sensitive-stop instruction in a sequence of instructions of the first process. That the first instruction has been designated as a sensitive instruction may be detected 610 based on detection of the sensitive-start instruction. For example, the first instruction may be a member of a subsequence of instructions that is immediately preceded by the sensitive-start instruction and immediately followed by the sensitive-stop instruction in the sequence of instructions of the first process, and all members of the subsequence of instructions may be executed subject to the constraint. For example, the technique 700 of FIG. 7 may be implemented to detect 610 that the first instruction of the first process has been designated as a sensitive instruction.

The technique 600 includes checking 620 whether a sensitive handling enable bit in a process state register storing a state of the first process is enabled. A value of the sensitive handling enable bit may either correspond to an enabled state (i.e., the associated process is authorized for execution subject to the constraint) or correspond to a disabled state (i.e., the associated process is not authorized for execution subject to the constraint). In some implementations, the sensitive handling enable bit may be interpreted as active low. In some implementations, the sensitive handling enable bit may be interpreted as active high.

The technique 600 includes, if (at step 625) the sensitive handling enable bit is enabled, then, responsive to detection of the sensitive instruction and enablement of the sensitive handling enable bit, invoking 630 a constraint for execution of the first instruction. For example, invoking 630 the constraint for execution of the first instruction may include updating a microarchitectural state of a processor core to cause a processor pipeline (e.g., the processor pipeline 104) to execute the first instruction subject to the constraint. For example, a processor pipeline may be configured to execute instructions from two or more threads in parallel using execution units of the processor pipeline, and the constraint may prevent parallel execution of instructions from other threads while the first instruction is being executed 640 by an execution unit of a processor pipeline.

The technique 600 includes executing 640 the first instruction subject to the constraint. The constraint may impair performance of a processor core implementing the technique 600 while enhancing security of the first process. For example, executing 640 the first instruction subject to the constraint may prevent or mitigate side channel attacks (e.g., a Portsmash attack).

The technique 600 includes, if (at step 625) the sensitive handling enable bit is disabled, then, responsive to disablement of the sensitive handling enable bit associated with the first process, executing 650 the first instruction of the first process without the constraint. For example, forcing the first instruction to be executed 650 without the constraint may preserve performance of a processor core implementing the technique 600 and prevent attacks by malicious processes using a dynamic designation of instructions as sensitive instructions.

The technique 600 includes executing 660 a second instruction (e.g., an instruction that has not been designated as sensitive) of the first process without the constraint. Executing 660 a second instruction without the constraint may preserve performance of a processing core implementing the technique 600. By allowing an authorized process to designate individual instructions or subsequences of instructions as sensitive, performance of a processing core implementing the technique 600 may be improved relative to processors that only allow designation of sensitive processes or threads.

The technique 600 includes updating 670 a value of the sensitive instruction enabled bit based on an instruction of a second process that has a higher priority than the first process. For example, the second process may be a hypervisor process. For example, the second process may be an operating system process. For example, the second process may implement the technique 800 of FIG. 8 to manage requests for authorization to utilize execution subject to the constraint.

For simplicity of explanation, the technique 600 is depicted and described as a series of blocks, steps, or operations. However, the blocks, steps, or operations in accordance with this disclosure can occur in various orders and/or concurrently. For example, step 670 may be performed asynchronously in response to an instruction from the second process (e.g., a hypervisor process). Additionally, other steps or operations not presented and described herein may be used. Furthermore, not all illustrated steps or operations may be required to implement a technique in accordance with the disclosed subject matter.

Figure 7:
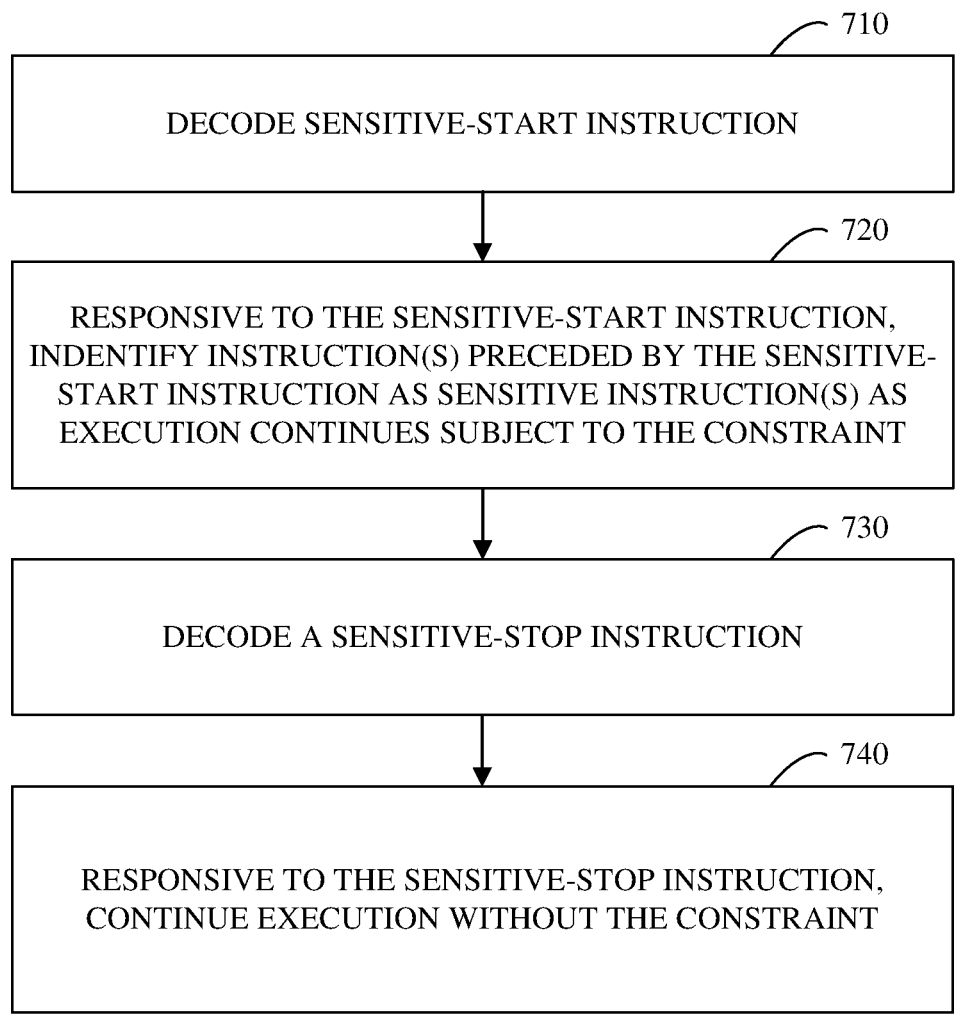
FIG. 7 is a flow chart of an example of a technique for detecting that one or more instructions of a process have been designated as sensitive instructions.

FIG. 7 is a flow chart of an example of a technique 700 for detecting that one or more instructions of a process have been designated as sensitive instructions. The technique 700 includes decoding 710 a sensitive-start instruction; and responsive to the sensitive-start instruction, identifying 720 one or more instructions preceded by the sensitive-start instruction as sensitive instructions while execution continues subject to a constraint for sensitive instructions. Execution of instructions of the process subject to the constraint may continue until a sensitive-stop instruction is decoded 730. The technique 700 includes, responsive to the sensitive-stop instruction, continuing 740 execution of instructions of the process without the constraint. For example, a sequence of instructions of the process may include a subsequence of instructions (e.g., a region of code) that is immediately preceded by the sensitive-start instruction and immediately followed by the sensitive-stop instruction. The technique 700 may be implemented to execute all members of the subsequence of instructions subject to the constraint, while executing instructions of the process outside of the subsequence of instructions without the constraint to enhance security while limiting the impact on processor performance. For example, the technique 700 may be implemented using the integrated circuit 101 of FIG. 1. For example, the technique 700 may be implemented using the integrated circuit 500 of FIG. 5.

Figure 8:
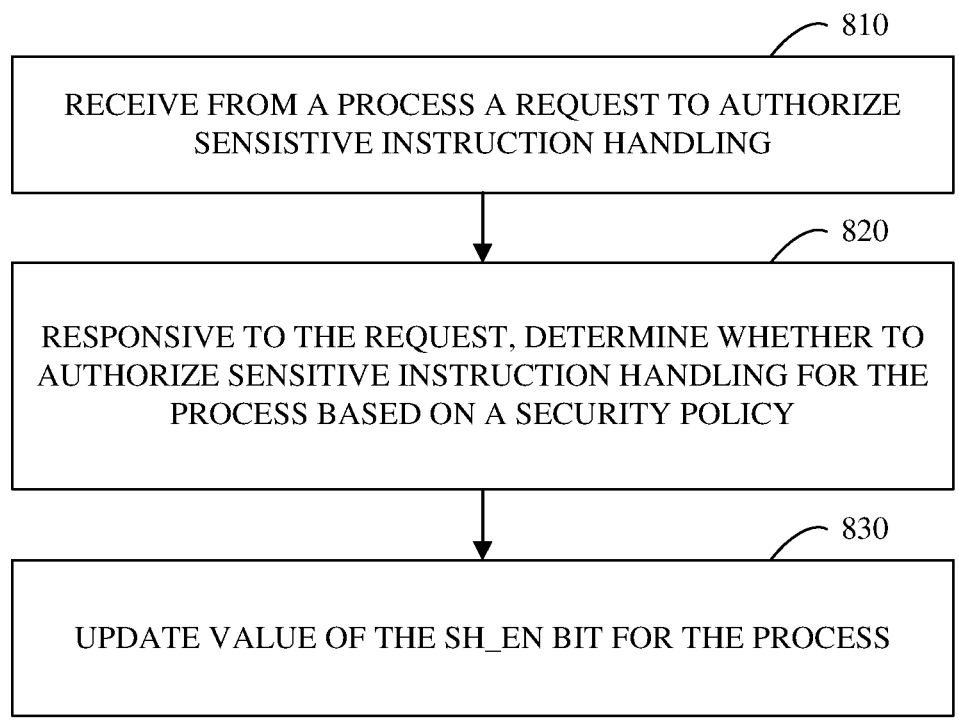
FIG. 8 is a flow chart of an example of a technique for updating an authorization for sensitive handling of instructions for a process using a higher priority process.

FIG. 8 is a flow chart of an example of a technique 800 for updating an authorization for sensitive handling of instructions for a process using a higher priority process. The technique 800 includes receiving 810 from a process a request to authorize sensitive instruction handling (i.e., execution of designated sensitive instructions subject to a constraint); responsive to the request, determining 820 whether to authorize sensitive instruction handling for the process based on a security policy; and updating 830 a value of a sensitive handling enable bit (e.g., the sensitive handling enable bit 522) based on the determination 820. For example, the value of the sensitive handling enable bit may be updated 830 using a specialized instruction and/or by writing to a register of an integrated circuit with restricted write permissions. For example, the technique 800 may be implemented by a high priority process (e.g., a hypervisor process or an operating system process) that runs on an integrated circuit (e.g., the integrated circuit 101 or the integrated circuit 500) and is used to manage access to hardware resources of the integrated circuit. A process seeking to utilize execution of designated sensitive instructions subject to the constraint may send the request (e.g., using a system call function causing an inter-process communication) in order to activate this feature before issuing instructions that the process will dynamically designate as sensitive. In some implementations, the high priority process may respond with a message back to the process that either confirms grant of the request or denies the request. In some implementations, the high priority process does not provide any feedback to the process indicating whether the request has been granted, which may serve to thwart some malicious processes.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the integrated circuit 101 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit for executing instructions, comprising:
   a sensitive handling enable indicator; and
   a processor core comprising a processor pipeline configured to execute instructions from two or more threads in parallel using execution units of the processor pipeline, the processor core configured to:

detect that a first instruction of a first thread has been designated as a sensitive instruction;

check whether the sensitive handling enable indicator is enabled;

responsive to detection of the sensitive instruction and enablement of the sensitive handling enable indicator, invoke a constraint for execution of the first instruction that selectively blocks at least one of issue, dispatch, or execution of selected instructions of threads other than the first thread during execution of the first instruction by one of the execution units of the processor pipeline, where the constraint is configured to be applied only to one or more instructions designated as sensitive;

execute the first instruction subject to the constraint; and execute a second instruction of the first thread that has not been designated as a sensitive instruction without the constraint while the sensitive handling enable indicator is still enabled.

2. The integrated circuit of claim 1, in which the first instruction is preceded by a sensitive-start instruction and followed by a sensitive-stop instruction in a sequence of instructions of the first process, and the processor core is configured to detect that the first instruction has been designated as a sensitive instruction based on detection of the sensitive-start instruction.

3. The integrated circuit of claim 2, in which the first instruction is a member of a subsequence of instructions that is immediately preceded by the sensitive-start instruction and immediately followed by the sensitive-stop instruction in the sequence of instructions of the first process, and the processor core is configured to execute all members of the subsequence of instructions subject to the constraint.

4. The integrated circuit of claim 1, in which the sensitive handling enable indicator comprises information stored in a process state register storing a state of the first process.

5. An integrated circuit for executing instructions, comprising:

a sensitive handling enable indicator; and a processor core configured to:

detect that a first instruction of a first process has been designated as a sensitive instruction;

check whether the sensitive handling enable indicator is enabled;

responsive to detection of the sensitive instruction and enablement of the sensitive handling enable indicator, invoke a constraint for execution of the first instruction that selectively blocks at least one of issue, dispatch, or execution of selected instructions other than the first instruction during execution of the first instruction;

execute the first instruction subject to the constraint; and execute a second instruction of the first process without the constraint;

wherein the first instruction includes a sensitive flag comprising at least one bit, and the processor core is configured to detect that the first instruction has been designated as a sensitive instruction by evaluating the sensitive flag of the first instruction.

6. The integrated circuit of claim 5, in which the processor core is configured to update a value of the sensitive handling enable indicator based on an instruction of a second process that has a higher priority than the first process.

7. The integrated circuit of claim 6, in which the second process is a hypervisor process.

8. The integrated circuit of claim 6, in which the second process is an operating system process.

9. The integrated circuit of claim 6, in which the processor core is configured to:

detect that a third instruction of a third process has been designated as a sensitive instruction;

check whether the sensitive handling enable indicator is enabled; and responsive to disablement of the sensitive handling enable indicator, execute the third instruction of the third process without the constraint.

10. The integrated circuit of claim 5, comprising:

a processor pipeline configured to execute instructions from two or more threads in parallel using execution units of the processor pipeline; and in which the constraint prevents parallel execution of instructions from other threads while the first instruction is being executed by an execution unit of the processor pipeline.

11. The integrated circuit of claim 5, in which the first instruction is a cryptographic instruction.

12. The integrated circuit of claim 5, in which the sensitive handling enable indicator comprises information stored in a register.

13. A method comprising:

detecting that a first instruction of a first thread has been designated as a sensitive instruction;

checking whether a sensitive handling enable indicator is enabled;

responsive to detection of the sensitive instruction and enablement of the sensitive handling enable indicator, invoking a constraint for execution of the first instruction that selectively blocks at least one of issue, dispatch, or execution of selected instructions of threads other than the first thread during execution of the first instruction by an execution unit of a processor pipeline configured to execute instructions from two or more threads in parallel using execution units of the processor pipeline, where the constraint is configured to be applied only to one or more instructions designated as sensitive;

executing the first instruction subject to the constraint; and executing a second instruction of the first thread that has not been designated as a sensitive instruction without the constraint while the sensitive handling enable indicator is still enabled.

14. The method of claim 13, in which the first instruction is preceded by a sensitive-start instruction and followed by a sensitive-stop instruction in a sequence of instructions of the first process, and the method comprises:

detecting that the first instruction has been designated as a sensitive instruction based on detection of the sensitive-start instruction.

15. The method of claim 14, in which the first instruction is a member of a subsequence of instructions that is immediately preceded by the sensitive-start instruction and immediately followed by the sensitive-stop instruction in the sequence of instructions of the first process, and the method comprises:

executing all members of the subsequence of instructions subject to the constraint.

16. A method comprising:

detecting that a first instruction of a first process has been designated as a sensitive instruction;

checking whether a sensitive handling enable indicator is enabled;

responsive to detection of the sensitive instruction and enablement of the sensitive handling enable indicator, invoking a constraint for execution of the first instruction that selectively blocks at least one of issue, dispatch, or execution of selected instructions other than the first instruction during execution of the first instruction;

executing the first instruction subject to the constraint; and executing a second instruction of the first process without the constraint;

wherein detecting that the first instruction has been designated as a sensitive instruction comprises:

evaluating a sensitive flag comprising at least one bit included in the first instruction.

17. The method of claim 16, comprising:

updating a value of the sensitive handling enable indicator based on an instruction of a second process that has a higher priority than the first process.

18. The method of claim 17, in which the second process is a hypervisor process.

19. The method of claim 17, in which the second process is an operating system process.

20. The method of claim 17, comprising:

detecting that a third instruction of a third process has been designated as a sensitive instruction;

checking whether a sensitive handling enable indicator associated with the third process is enabled; and responsive to disablement of the sensitive handling enable indicator associated with the third process, executing the third instruction of the third process without the constraint.

21. The method of claim 16, in which the constraint prevents parallel execution of instructions from other threads while the first instruction is being executed by an execution unit of a processor pipeline, wherein the processor pipeline is configured to execute instructions from two or more threads in parallel using execution units of the processor pipeline.

22. The method of claim 16, in which the first instruction is a cryptographic instruction.

23. The method of claim 16, in which the sensitive handling enable indicator comprises information stored in a process state register storing a state of the first process.

24. An integrated circuit for executing instructions, comprising:

a sensitive handling enable indicator;

a processor core comprising a processor pipeline configured to execute instructions from two or more threads in parallel using execution units of the processor pipeline, the processor core configured to:

fetch a first instruction of a first thread, wherein the first instruction includes a sensitive flag comprising at least one bit that indicates the first instruction is sensitive;

based on the sensitive flag and a current value of the sensitive handling enable indicator, invoke a constraint for execution of the first instruction that selectively blocks at least one of issue, dispatch, or execution of selected instructions of threads other than the first thread during execution of the first instruction by one of the execution units of the processor pipeline, where the constraint is configured to be applied only to one or more instructions designated as sensitive;

execute the first instruction subject to the constraint; and execute a second instruction of the first thread that has not been designated as a sensitive instruction without the constraint while the sensitive handling enable indicator is still enabled.

25. An integrated circuit for executing instructions, comprising:

a processor pipeline configured to execute instructions from two or more threads in parallel using execution units of the processor pipeline;

a sensitive handling enable indicator; and a thread hazard circuitry configured to:

detect that a first instruction of a first thread has been designated as a sensitive instruction and that a second instruction of the first thread has not been designated as a sensitive instruction, check whether the sensitive handling enable indicator is enabled, invoke a constraint to block instructions of threads other than the first thread from being executed while the first instruction is being executed by one of the execution units of the processor pipeline, where the constraint is configured to be applied only to one or more instructions designated as sensitive, and execute the second instruction while the sensitive handling enable indicator is still enabled without blocking instructions of threads other than the first thread from being executed while the second instruction is being executed by one of the execution units of the processor pipeline.

26. An integrated circuit for executing instructions, comprising:

a processor pipeline configured to execute instructions from two or more threads in parallel using execution units of the processor pipeline;

means for storing a sensitive handling enable indicator;

means for detecting that a first instruction of a first thread has been designated as a sensitive instruction, checking whether the sensitive handling enable indicator is enabled, and, responsive to detection of the sensitive instruction and enablement of the sensitive handling enable indicator, invoking a constraint for execution of the first instruction that selectively blocks at least one of issue, dispatch, or execution of selected instructions of threads other than the first instruction thread during execution of the first instruction by one of the execution units of the processor pipeline, where the constraint is configured to be applied only to one or more instructions designated as sensitive; and means for executing the first instruction subject to the constraint and executing a second instruction of the first thread that has not been designated as a sensitive instruction without the constraint while the sensitive handling enable indicator is still enabled.

27. The integrated circuit of claim 26, comprising:

means for updating a value of the sensitive handling enable indicator based on an instruction of a second process that has a higher priority than the first process.

28. The integrated circuit of claim 26, comprising:

a processor pipeline configured to execute instructions from two or more threads in parallel using execution units of the processor pipeline; and in which the constraint prevents parallel execution of instructions from other threads while the first instruction is being executed by an execution unit of the processor pipeline.

29. The integrated circuit of claim 26, in which the sensitive instruction is a cryptographic instruction.

\* \* \* \* \*